United States Patent [19]
Sugahara

[11] Patent Number: 5,236,541
[45] Date of Patent: Aug. 17, 1993

[54] JOINED PRISM ASSEMBLY AND METHOD AND APPARATUS FOR MANUFACTURING SAME

[75] Inventor: Bunkichi Sugahara, Tokyo, Japan

[73] Assignee: Ashai Kogaku Kogyo Kabushiki Kaisha, Tokyo, Japan

[21] Appl. No.: 861,541

[22] Filed: Apr. 1, 1992

Related U.S. Application Data

[62] Division of Ser. No. 598,423, Oct. 16, 1990, Pat. No. 5,122,217.

[30] Foreign Application Priority Data

Oct. 24, 1989 [JP] Japan .................................. 1-277686

[51] Int. Cl.⁵ .............................................. B32B 31/00
[52] U.S. Cl. ..................................... 156/556; 269/37; 269/40; 269/269
[58] Field of Search ................... 156/556; 269/37, 40, 269/41, 203, 269; 359/629, 630, 900

[56] References Cited

U.S. PATENT DOCUMENTS

| 2,737,076 | 3/1956 | Rock, Jr. | 359/900 X |
| 2,754,718 | 7/1956 | Rock et al. | 359/900 X |
| 3,182,988 | 5/1965 | Woodall | 269/37 |
| 4,475,726 | 10/1984 | Smith | 269/41 |

FOREIGN PATENT DOCUMENTS

| 285677 | 5/1914 | Fed. Rep. of Germany . |
| 53-106147 | 9/1978 | Japan . |

OTHER PUBLICATIONS

English Language abstract of Japanese Patent 53-106147.

*Primary Examiner*—David A. Simmons
*Assistant Examiner*—J. Sells
*Attorney, Agent, or Firm*—Sandler Greenblum & Bernstein

[57] ABSTRACT

A joined prism assembly having more than two prisms adhered to each other at joining surfaces is disclosed. The joined prism includes stepped portions between the end faces of the prisms adjacent to the joining surfaces for defining exposed positioning reference surfaces for when the prisms are adhered to each other.

12 Claims, 4 Drawing Sheets

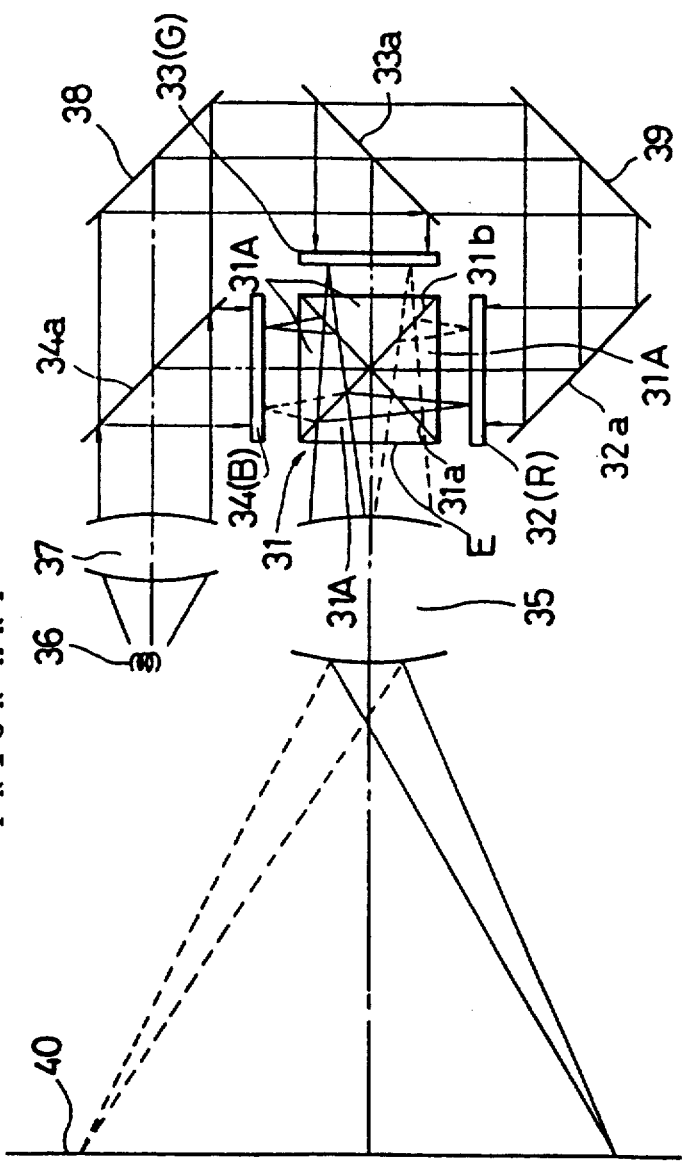

JOINED PRISM ASSEMBLY AND METHOD AND APPARATUS FOR MANUFACTURING SAME

This application is a division of U.S. Ser. No. 07/598,423 filed Oct. 10, 1990 U.S. Pat. No. 5,122,217.

BACKGROUND OF THE INVENTION

1. Field of the Invention

The present invention relates to a joined (cemented) prism assembly and also to a method and an apparatus for manufacturing the same.

2. Description of the Related Art

A dichroic prism made of a joined prism assembly (that is, a rectangular parallelepiped prism) is used as a component of a projection display device.

The projection display device is used, for example, as a liquid crystal color projector wherein R (red), G (green) and B (blue) illuminating light rays are applied to three liquid crystal panels which give R, G and B color separation information, respectively, to obtain separate R, G and B images which are then combined and projected in the form of an enlarged color image through a projection lens.

FIG. 7 is a conceptual or schematic view of a device which employs a dichroic prism and dichroic mirrors for separation and combination (synthesis) of light rays, as an example of a conventional liquid crystal color projector of the type described above. Liquid crystal panels 32, 33 and 34 for R, G and B are disposed in opposing relation to three surfaces (defined as incident surfaces), respectively, of a dichroic prism 31 which is in the shape of a rectangular parallelepiped, and a projection lens 35 is disposed so as to face the remaining one surface (defined as an emergent surface E). A R (Red) reflecting dichroic mirror 32a, a G (green) reflecting dichroic mirror 33a and a B (blue) reflecting dichroic mirror 34a are disposed on the respective incidence sides of the liquid crystal panels 32, 33 and 34 at a 45° angle with respect to the associated optical axes. Illuminating light rays are made incident on these dichroic mirrors 32, 33 and 34. The illuminating light rays are obtained by passing light from a white light source 36 through a collimating condenser lens 37, thereby producing collimated (parallel) rays of light. The parallel light rays are applied successively to the B-reflecting dichroic mirror 34a, a total reflecting mirror 38, the G-reflecting dichroic mirror 33a, a total reflecting mirror 39 and the R-reflecting dichroic mirror 32a in this order.

The dichroic prism 31 is provided therein with a B (blue) reflecting film 31a and a R (red) reflecting film 31b which are at 45° to the corresponding optical axes and which are perpendicular to each other. Both the reflecting films 31a and 31b transmit G (green) light therethrough.

In the liquid crystal color projector, therefore, when the liquid crystal panels 32, 33 and 34 are irradiated with parallel light rays produced by a combination of the white light source 36 and the collimating lens 37 while these panels 32, 33 and 34 are being switched on the basis of the corresponding color information, red, green and blue light rays are respectively transmitted through the liquid crystal panels 32, 33 and 34 and enter the dichroic prism 31. The incident light rays are combined (superposed) through the B- and R-reflecting films 31a and 31b provided on the prism 31, and the combined picture image emerges from the emergence surface E of the prism 31 and is projected in the form of an enlarged image on a screen 40 through the projection lens 35.

The dichroic prism 31 used in the projection display device consists of four right-angle prisms 31A, each having an isosceles right triangle cross sectional shape. The right angle prisms 31A are joined to each other so that the adjacent sides of the triangles which define the right angle apexes are connected to each other. In the dichroic prism, a precise perpendicularity (squareness) of the joined surfaces of the four prisms and a strict linearity (i.e., flatness of the B-reflecting film 31a and the R-reflecting film 31b) are required, since otherwise a deviation of a projected and superposed image occurs.

However, to realize high perpendicularity and linearity of the joined surfaces of the four right prisms 31A which constitute a dichroic prism 31, it is necessary to join the four right prisms 31A with the help of a microscope through which an operator observes. This is, however, a very troublesome and complicated operation; moreover, it is not efficient.

SUMMARY OF THE INVENTION

The primary object of the present invention is to provide a joined prism assembly which can be simply, quickly and precisely manufactured with less labor.

In a joined prism assembly having more than two prisms according to the present invention, a significant feature of the invention resides in the provision of stepped portions on the ends of the prisms to be joined, so that a joining end surface is exposed to be used as a reference surface for the joining operation.

According to an aspect of the present invention, there is provided a joined prism assembly having more than two prisms adhered to each other at joining surfaces. The assembly includes a stepped portion between the end faces of the prisms adjacent to the joining surfaces for defining exposed positioning reference surfaces when the prisms are adhered to each other.

Preferably, the prisms have different thicknesses, so that the positioning reference surfaces are defined at the sides of the prisms automatically.

Alternatively, the prisms can have identical thicknesses. In the alternative, the joining surfaces of the prisms are deviated, in the direction of the thickness, when they are adhered to each other.

According to another aspect of the present invention, there is provided a method for manufacturing a joined prism assembly having more than two prisms adhered to each other at joining surfaces thereof. The method includes a step of forming a stepped portion between the end faces of the prisms adjacent to the joining surfaces for defining exposed positioning reference surfaces when the prisms are adhered to each other, and a step of adhering the prisms with the help of the exposed positioning reference surfaces.

According to still another aspect of the present invention, there is provided an apparatus for manufacturing a joined prism assembly having a plurality of prism half-assemblies, each having more than one prism adhered to each other at joining surfaces thereof and at least one exposed reference surface for positioning. The apparatus comprises a prism supporting device for holding one of the prism half-assemblies at a predetermined position, including first reference surfaces with which outer surfaces of the prism half-assembly can come into contact and at least one second reference surface with which the exposed reference surface can come into contact. A positioning device for positioning another prism half-assembly which is located on and adhered to the prism half-assembly held by the prism supporting device is provided the positioning device is provided with a third reference surface having a predetermined relationship to the second reference surface.

The present invention can be applied to more than two prisms and is particularly advantageous when applied to a rectangular parallelepiped joined prism assembly, such as a dichroic prism, which can be used to combine an image.

BRIEF DESCRIPTION OF THE DRAWINGS

The invention will be described below in detail with reference to the accompanying drawings showing preferred embodiments of the present invention, in which:

FIG. 7 is a conceptual schematic view of a liquid crystal display device which employs a dichroic mirror as a joined prism assembly.

DESCRIPTION OF THE PREFERRED EMBODIMENTS

The illustrated embodiment is directed to a joined prism assembly in the shape of a square in front elevation, having four triangular prisms.

Figure 1:
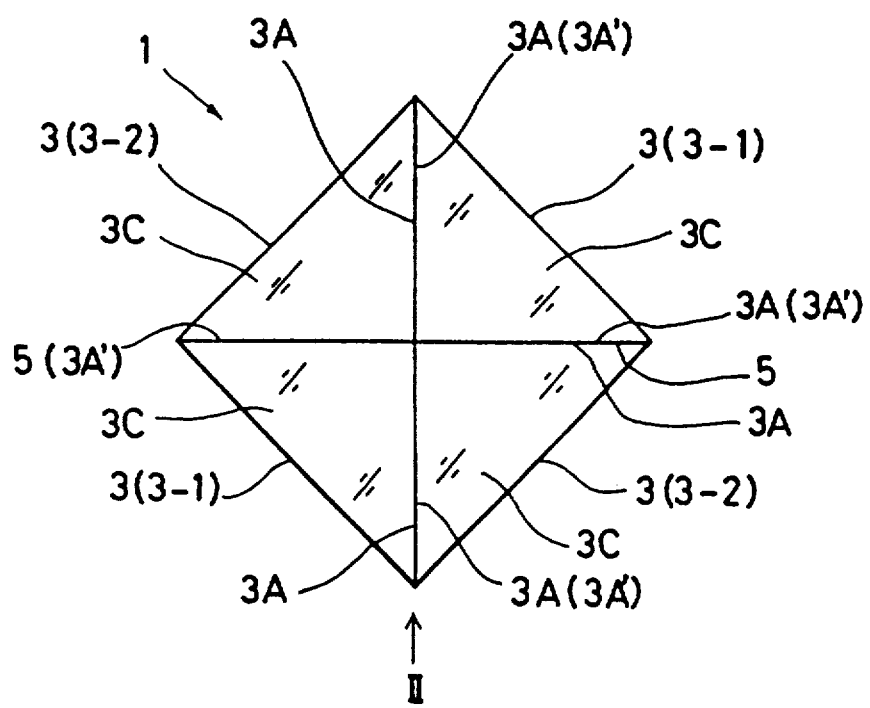
FIG. 1 is a front elevational view of a joined prism assembly according to the present invention.
Figure 2:
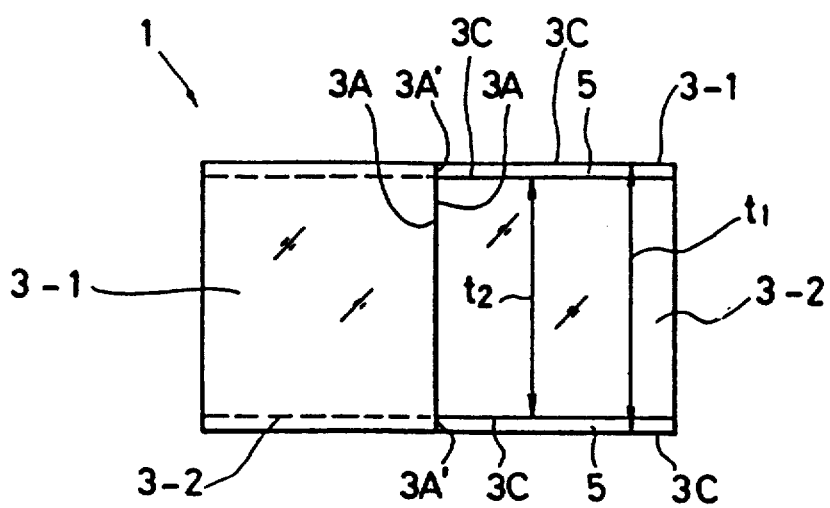
FIG. 2 is a plan view of a joined prism assembly according to the present invention, as viewed from the direction shown at an arrow II in FIG. 1.

FIGS. 1 and 2 show a product (that is, a joined prism assembly) having four prisms which are completely joined (adhered, cemented) to each other.

The four right-angle prisms 3 which constitute a rectangular parallelepiped prism 1 have identical isosceles right triangle cross-sections and are adhered to each other at the adjacent side faces (joining faces) 3A, defining the respective right angle apexes.

Among the four right prisms 3, two prisms 3-1 have a thickness $t_1$ larger than a thickness $t_2$ of the remaining two prisms 3-2. The prisms 3-1 (referred to as wide prisms) of a larger thickness $t_1$ and the prisms 3-2 (referred to as narrow prisms) of a small thickness $t_2$ are alternately arranged.

The adjacent side faces (that is, joining faces) 3A of the narrow prisms 3-2 defining the right angle apexes are symmetrically joined to the side faces (joining faces) 3A of the wide prisms 3-1 defining the right angle apexes, so that there are identical stepped portions 5 between the end faces 3C of the adjacent prisms 3-1 and 3-2. The stepped portions 5 define exposed joining end surfaces 3A' which appear in the vicinity of the opposite end faces of the prisms 3-1. The exposed joining end surfaces 3A' have an identical width.

It is not always necessary to adhere the right prisms 3-2 to the right prisms 3-1 in a strictly symmetrical arrangement. Namely, it is not always necessary for the exposed joining end surfaces 3A' to have the same width. This is because the stepped portions 5 are provided to partially expose the joining surfaces 3A of the prisms 3-1 thereby, to define reference surfaces for the joining operation. The reference surfaces make it possible to easily join the joining surfaces 3A at a right angle or along a line. Namely, when the wide prisms 3-1 and the narrow prisms 3-2 are alternately adhered to each other, the joining surfaces 3A are partially exposed due to the stepped portions 5 to provide positioning reference surfaces. When the four prisms 3 are adhered to each other so that the adjacent joining surfaces 3A form a right angle or lie in the same plane, the rectangular parallelepiped prism 1 is obtained. The thicknesses of the prisms 3-1 and 3-2, and particularly, the thickness $t_2$ of the prism 3-2 are such that the end portions of the prisms 3-2 corresponding to the stepped portions are not used as a prism in normal use.

Thus, according to the present invention, the rectangular parallelepiped prism 1 can be manufactured with high precision, using a jig which utilizes the reference surfaces defined by the exposed joining end surfaces 3A' (or the stepped portions 5) without using an additional optical element, such as a microscope, unlike in the prior art.

FIGS. 3 through 6 show a method and an apparatus for joining the prisms, according to the present invention.

Figure 3:
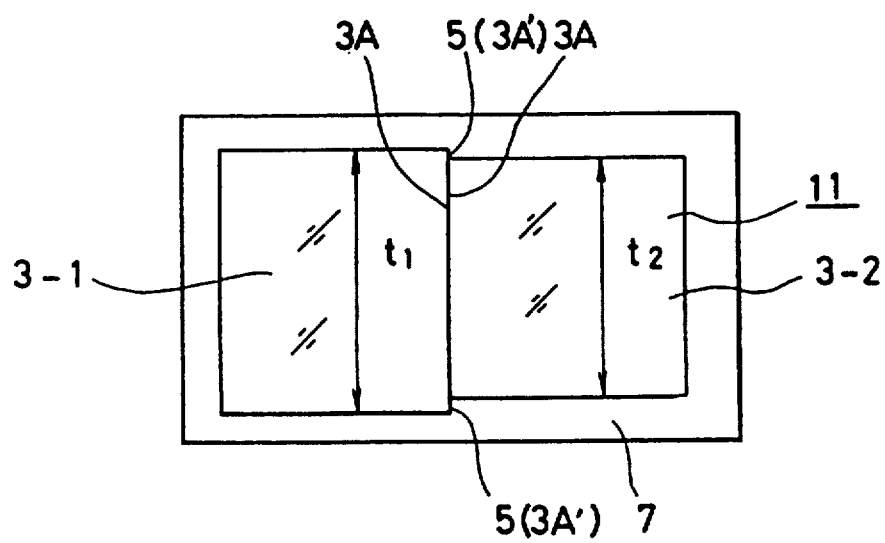
FIG. 3 is a plan view of two triangular prisms joined to each other.
Figure 4:
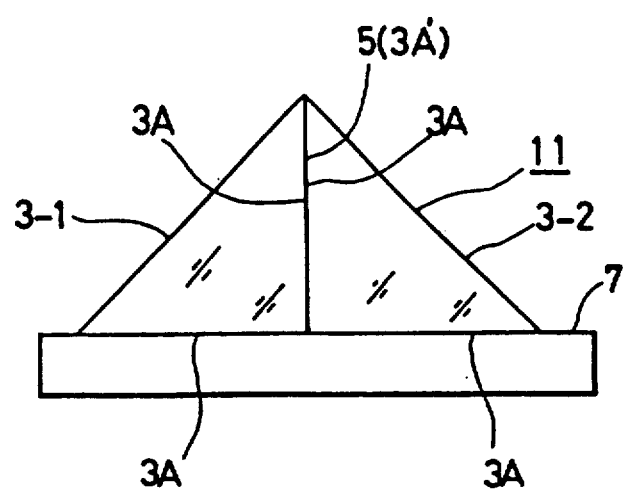
FIG. 4 is a front elevational view of FIG. 3.

First, two right prisms 3-1 having the same thickness $t_1$ and two right prisms 3-2 having the same thickness $t_2$ which is smaller than the thickness $t_1$ ($t_2 < t_1$) are prepared. Thereafter, one of the right prisms 3-1 and one of the right prisms 3-2 are located on a flat surface 7 in such a way that the side surfaces 3A thereof lie on the flat surface 7. Thereafter, the other side faces 3A of the two prisms 3-1 and 3-2 are adhered to each other by an adhesive such as a epoxy resin adhesive or an ultraviolet hardening adhesive, etc. (FIG. 4). In this adhesion, the side face 3A of the prism 3-2 having the smaller thickness $t_2$ is adhered to the center of the corresponding side face 3A of the prism 3-1 to provide the stepped portions 5 on the opposite sides of the joining surfaces 3A, as shown in FIGS. 3 and 4. Consequently, the joining end surfaces 3A' are exposed.

Figure 5:
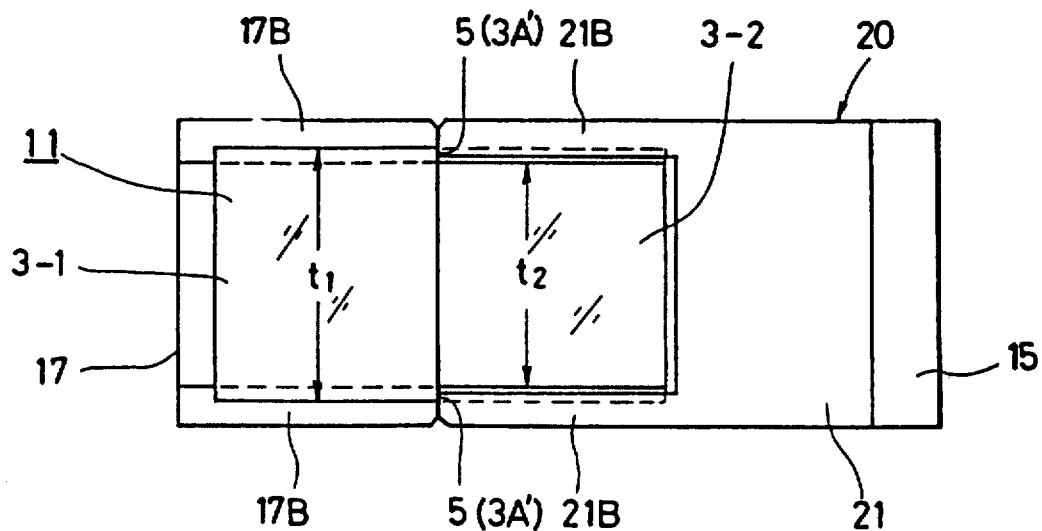
FIG. 5 is a plan view of an apparatus for manufacturing a joined prism assembly and prisms joined by the apparatus.
Figure 6:
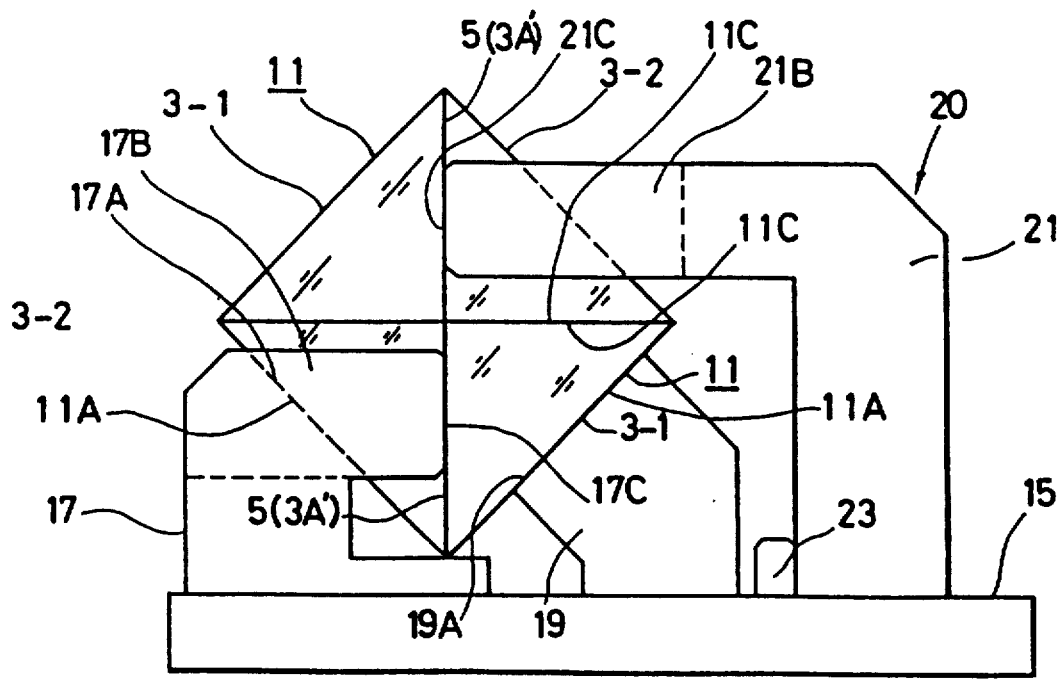
FIG. 6 is a front elevational view of FIG. 5.

Two of the same prism half-assemblies 11 shown in FIGS. 3 and 4, each having one prism 3-1 and one prism 3-2. are prepared and adhered to each other, using a joining device 20, as shown in FIGS. 5 and 6.

The joining device 20 is integrally provided with a base plate 15 which has an abutment surface member 17 and a supporting surface member 19 which constitutes, together with the abutment surface member 17, a prism assembly supporting means. The base plate 15 is movably attached with a movable support 21 which constitutes a positioning means. The movement of the movable support 21 toward the abutment surface member is restricted by a stop 23 provided on the base plate 15.

The abutment surface member 17 has an oblique reference 17A as a reference surface, and two arms 17B projecting from the opposite sides of the oblique surface 17A. Each arm 17B has at its front end a vertical reference surface 17C. The arms 17B are spaced from one another at a predetermined distance large enough to insert and remove the right prism 3-2, having the small thickness $t_2$ into and from a space defined between the two arms 17B.

The supporting surface member 19 has an oblique surface 19A, as a reference surface, opposing the oblique surface 17A. The oblique surfaces 17A and 19A form exactly a 45° angle with respect to the base plate 15 in the opposite directions, respectively, so that the oblique surfaces 17A and 19A together form a 90° angle. The movable support 21 has arms 21B projecting from the opposite upper ends. The arms 21B have vertical reference surfaces 21C. The arms 21B are spaced from one another at a predetermined distance large enough to insert and remove the right prism 3-2, having the small thickness $t_2$ into and from a space defined between the two arms 21B.

The vertical reference surfaces 17C and the vertical reference surfaces 21C of the movable support 21 form exactly a 90° angle with respect to the base plate 15 and are formed so that when the movable support 21 comes into contact with the stop 23, the vertical reference surfaces 17C and 21C lie in a vertical plane.

A pair of half-assemblies 11 shown in FIGS. 3 and 4 are adhered to each other, using the joining apparatus 20 shown in FIGS. 5 and 6, as follows:

First, the side faces (incidence and emergence surfaces) 11A of one of the half-assemblies 11 are placed on the oblique surfaces 17A and 19A of the abutment surface member 17 and the supporting surface member 19. The prism 3-2, having the smaller thickness $t_2$, is located on the abutment surface member 17, so that the side face 11A thereof is located on the oblique surface 17A, and the stepped portions 5 (joining surfaces 3A) are located on the vertical reference surfaces 17C. This state is stable. Namely, the half-assembly 11 is firmly held in a stable position defined by the oblique surfaces 17A and 19A and the vertical reference surfaces 17C.

Thereafter, an epoxy resin adhesive or an ultraviolet hardening adhesive is applied to the upper joining surfaces 11C of the two prisms of the half-assembly 11, and then the other half-assembly 11 is placed on the upper joining surfaces 11C in such a way that the lower joining surfaces 11C of the two prisms of the other half-assembly 11 are located on the upper joining surfaces 11C. Note that the prism 3-1 of a larger thickness $t_1$ is located on the abutment surface member 17. Namely, the wide prism 3-1 of the upper half-assembly 11 is located on the narrow prism 3-2 of the lower half-assembly 11.

Thereafter, the movable support 21 is moved forward until it comes into contact with the stop 23 while the vertical reference surface 21C of the movable support 21 bears against the stepped portions 5 of the upper half-assembly 11.

When the movable support 21 comes into contact with the stop 23, the vertical reference surfaces 21C and 17C lie on a same plane, as mentioned above, and accordingly, the stepped portions 5 (joining surfaces 3A) of the upper and lower half-assemblies 11, on which the vertical reference surfaces 21C and 17C bear, also lie on a same plane. Consequently, the upper half-assembly can be firmly joined to the lower half-assembly by adhering the side faces 11C of the half-assemblies to each other by an epoxy adhesive or ultraviolet hardening adhesive to complete a prism assembly. Thus, according to the present invention, a rectangular parallelepiped prism 1 can be precisely and easily obtained without using an additional optical instrument, such as a microscope.

It goes without saying that when a dichroic prism as shown in FIG. 7 is prepared according to the present invention, predetermined reflecting films are interposed between the joining surfaces.

Although the prisms 3-1, having a larger thickness $t_1$, and the prisms 3-2, having a small thickness $t_2$, are alternately arranged to form a rectangular parallelepiped prism in the illustrated embodiment, it is possible to manufacture a rectangular parallelpiped prism which has two right prisms 3-1 of a larger thickness $t_1$, and two right prisms 3-2 of a small thickness $t_2$ that are located side by side. Namely, the right prism 3-1 of the upper half-assembly is located on the right prism 3-1 of the lower half-assembly, and the right prism 3-2 of the upper half-assembly is located on the right prism 3-1 of the lower half-assembly. In this alternative, the direction of the movable support 21 is reversed. Namely, the arms 21B of the movable support 21 project in the right hand direction in FIG. 6. That is, the movable support 21 in the alternative and the movable support shown in FIG. 6 are symmetrical with respect to the vertical plane in which the reference surfaces 17C lie.

Although in the illustrated embodiment, the prisms 3-1 and 3-2 have different thicknesses to provide stepped portions defining the positioning reference surfaces in the above-mentioned embodiment, the thicknesses of the prisms are optional. The significant concept of the present invention is the provision of a partially exposed reference surface on the joining surfaces of two prisms when the latter are adhered to each other.

For instance, if the two prisms 3-1 and 3-2 have the same thickness, the joining surfaces thereof can be partially deviated from the center thereof in the direction of the thickness to provide an exposed reference surface.

The prisms are not limited to the right prisms and can be of any sectional shape, such as trapezoid.

Furthermore, the number of prisms is not limited to four and is optional.

Although all the prisms are assembled in such a way that they are parallel with each other in the direction of the thickness in the illustrated embodiment, the parallel arrangement is not always necessary. For instance, it is possible to connect the two half-assemblies at a predetermined angle in the direction of the thickness.

I claim:

1. An apparatus for manufacturing a joined prism assembly having a plurality of prism half-assemblies, each having more than one prism adhered to each other at joining surfaces, and having at least one exposed reference surface for positioning, wherein said apparatus comprises:

prism supporting means for holding one of said prism half-assemblies at a predetermined position, including first reference surfaces with which outer surfaces of said prism half-assembly can come into contact and at least one second reference surface with which an exposed reference surface can come into contact, positioning means for positioning another prism half-assembly which is located on and adhered to said one prism half-assembly held by said prism supporting means, said positioning means provided with a third reference surface having a predetermined relationship to said second reference surface, and said prism assembly being in the shape of a rectangular parallelpiped and includes two wide and two narrow right-angle prisms having an isosceles right triangle cross-sectional shape and adhered to each other at their adjacent sides defining right-angle apexes, each of said prism half-assemblies having at least one stepped portion between end faces of the prisms adjacent to said joining surfaces for defining at least one exposed positioning reference surface when said prisms are adhered to each other.

2. The apparatus according to claim 1, wherein said positioning means positions said other prism half-assembly on said one prism half-assembly held on said prism supporting means, with the help of said reference surface of said other prism half-assembly.

3. The apparatus according to claim 1, wherein said prism supporting means comprises a pair of oblique surfaces with which adjacent side faces of said one prism half-assembly defining one of said right angle apexes thereof can come into contact and at least one vertical reference surface with which said at least one exposed reference surface of said prism half-assembly can come into contact.

4. The apparatus according to claim 1, wherein said positioning means comprises said at least one vertical reference surface which lies in the same vertical plane as said at least one vertical reference surface of said prism supporting means.

5. The apparatus according to claim 4, wherein said at least one vertical reference surface of said positioning means faces in a direction opposite to said at least one vertical reference surface of said prism supporting means.

6. The apparatus according to claim 4, wherein said at least one vertical reference surface of said positioning means faces in the same direction as said at least one vertical reference surface of said prism supporting means.

7. The apparatus according to claim 5, wherein said positioning means comprises a movable member on which said at least one vertical reference surface is provided.

8. The apparatus according to claim 6, wherein said positioning means comprises a movable member on which said at least one vertical reference surface is provided.

9. The apparatus according to claim 7, further comprising a base plate on which said movable member is movably supported.

10. The apparatus according to claim 8, further comprising a base plate on which said movable member is movably supported.

11. The apparatus according to claim 9, further comprising a stop for restricting the movement of said movable plate on said base plate.

12. The apparatus according to claim 10, further comprising a stop for restricting the movement of said movable plate on said base plate.

* * * * *

UNITED STATES PATENT AND TRADEMARK OFFICE
CERTIFICATE OF CORRECTION

PATENT NO. : 5,236,541
DATED : August 17, 1993
INVENTOR(S) : B. SUGAHARA

It is certified that error appears in the above-indentified patent and that said Letters Patent is hereby corrected as shown below: On the cover page: Item

[73], Assignee, line 1, change "Ashai" to -

--Asahi---.

Signed and Sealed this

Thirtieth Day of April, 1996

Attest:

BRUCE LEHMAN

Attesting Officer

Commissioner of Patents and Trademarks